United States Patent [19]

Franklin et al.

[11] Patent Number: 4,761,608
[45] Date of Patent: Aug. 2, 1988

[54] IN USE POSITION MEASURING DEVICE CALIBRATION

[75] Inventors: Philip C. Franklin, Netherton; Alan P. Ogburn, Cirencester, both of England

[73] Assignee: Holset Engineering Company Limited, Turnbridge, England

[21] Appl. No.: 900,572

[22] Filed: Aug. 26, 1986

[30] Foreign Application Priority Data

Aug. 23, 1985 [GB] United Kingdom ............... 8521135

[51] Int. Cl.⁴ ............... G01R 35/00; F02M 65/00; G01L 27/00; G01B 7/14
[52] U.S. Cl. ............... 324/202; 73/1 J; 123/349; 123/617; 324/208; 364/571
[58] Field of Search ............... 324/202, 207, 208; 340/686; 73/1 R, 1 D, 1 J, 4 R; 364/571; 123/340, 349–353, 414, 418, 419, 479, 617

[56] References Cited

U.S. PATENT DOCUMENTS

| | | | |
|---|---|---|---|
| 4,051,712 | 10/1977 | Zias et al. | 73/4 R |
| 4,181,944 | 1/1980 | Yamauchi et al. | 364/571 X |
| 4,337,516 | 6/1982 | Murphy et al. | 364/571 X |
| 4,349,885 | 9/1982 | Thompson | 73/4 R X |
| 4,490,804 | 12/1984 | Martinsons | 364/571 |

Primary Examiner—Gerard R. Strecker
Attorney, Agent, or Firm—Gary M. Gron; Robert T. Ruff; Alan R. Loudermilk

[57] ABSTRACT

The disclosure illustrates a self calibrating control system for a variable area turbocharger incorporating a pneumatic actuator having a limiting position achieved at low actuating pressure levels. The calibration takes place by monitoring the demanded actuator signal. If it stays at a level reflecting a physically limiting position of the actuator for a predetermined time air pressure to the actuator is terminated to positively maintain the actuator in the no air position. A signal reflecting the actual position of the actuator is then substituted in the control system as a new zero pressure condition. This procedure is performed periodically and is aborted if normal control inputs are demanded thus resulting in a minimum disruption to normal control inputs. In addition the system provides for fault indications if the calibration procedure fails to result in a zero pressure calibration within predetermined limits. The system may be used to alternatively or in addition calibrate for a maximum pressure condition.

10 Claims, 7 Drawing Sheets

IN USE POSITION MEASURING DEVICE CALIBRATION

DESCRIPTION

This invention relates to the calibration of measuring devices which measure the position of a movable member. The invention relates particularly, not but exclusively, to the calibration of a displacement transducer, such as a variable inductor.

Measuring devices are in general susceptible in use to temperature variations which affect the readings taken either due to variation in values of electrical components or to physical thermally induced expansion of mechanical linkages or actuator components. Furthermore, where the device is associated in use with a number of other components, an initial calibration of the device can be upset during assembly unless the tolerances in the other components are carefully controlled and the initial calibration is very accurate. There is accordingly a need for such devices to be calibrated and/or recalibrated when installed or in use.

The above problems are solved in accordance with the present invention by a method of calibrating a measuring device which measures the position of a movable member, the member having a limiting position. The method comprises the steps of monitoring a signal reflecting a condition when the member reaches the limiting position, monitoring the time during which the signal reflecting the limiting position continues and comparing this time with a predetermined time, and, if the limiting condition continues for as long as the predetermined time, taking a measurement of the actual position of the movable member, and using this measurement to calibrate the device.

The invention also provides a controller for a measuring device which measures the position of a movable member, the member having a limiting position, the controller comprising means for monitoring a signal reflecting a condition when the member reaches the limiting position, timing means for monitoring the time during which the limiting condition continues, comparing this time with a predetermined time and generating a signal if the limiting condition continues for as long as the predetermined time, the controller being arranged to take an actual measurement of the position of the movable member upon generation of the signal and to calibrate the device using this measurement.

An example of the invention will now be described with reference to the accompanying drawings, in which.

Figure 2:
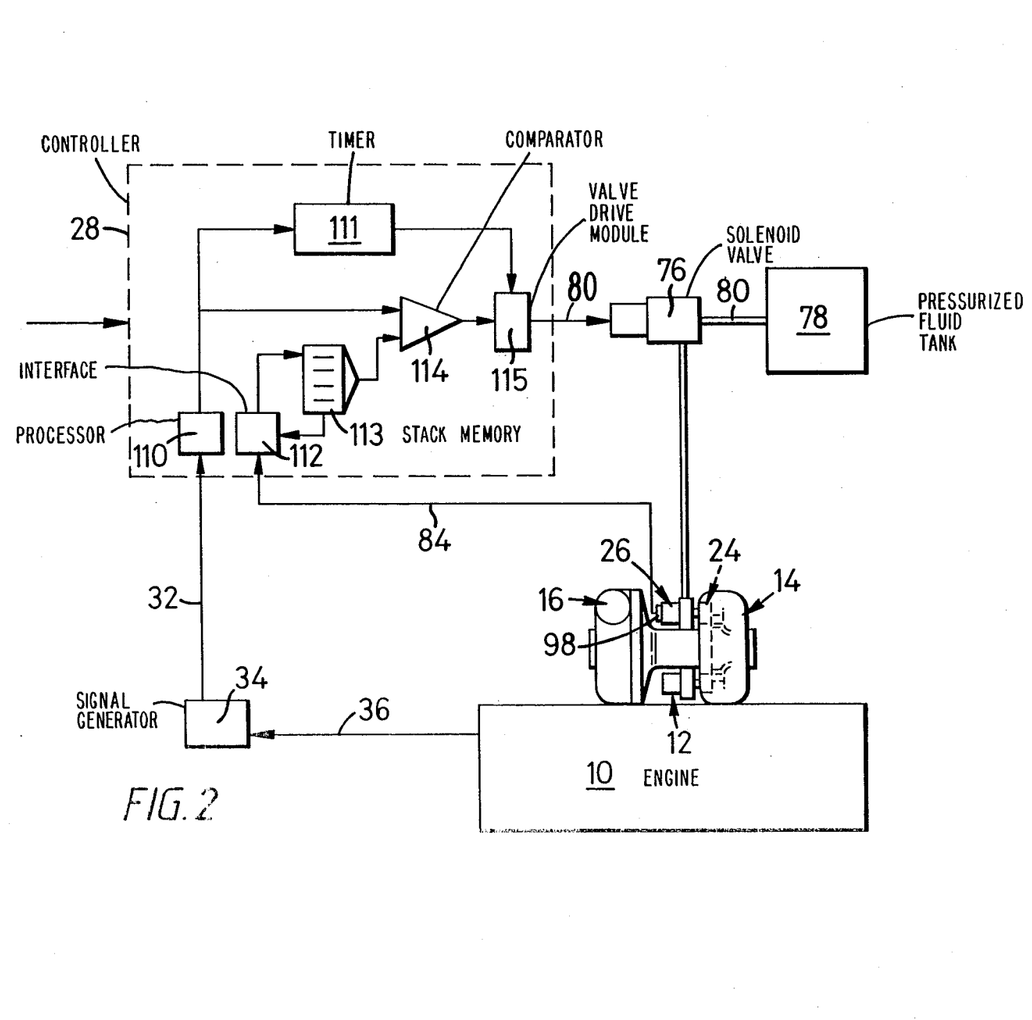
FIG. 2 is a diagrammatic representation of a turbocharged engine with a control system embodying the present invention.

Referring now to FIG. 2, an internal combustion engine 10 is fitted with a turbosupercharger (turbocharger) 12. The turbocharger 12 comprises a turbine portion 14 which receives exhaust gases from the engine 10 and extracts a portion of the energy in the exhaust stream to drive a compressor portion 16 which compresses ambient air and delivers it to the engine so that engine can produce more power and generally operate more efficiently. In order to focus on the present invention, certain details of the type of engine and engine/turbocharger interconnection have been omitted. However, persons skilled in the art should realize that suitable manifolds will be provided between the various portions of the turbocharger and the engine cylinders. Furthermore the engine may be either a spark ignition or compression ignition (diesel) type.

In order to achieve greater engine operating flexibility and efficiency, the turbine portion 14 has a variable effective area, an example of which will be described below. The exact form of the mechanism may be selected from any one of a number of variable geometry schemes and still achieve the benefits of the present invention.

In the present invention, a control system varies the effective area of the turbine portion 14 so that it is a predetermined function of engine rpm.

In order to achieve this control function, the control system comprises a variable area nozzle assembly 24 actuated by one or more actuating devices 26 energized by a controller 28 as described below. The controller 28 generates appropriate control signals to energize the variable area system in such a way that the control of area as a function of engine rpm is realized using a primary independent variable input from a line 32 connected to an rpm signal generating device 34 mechanically or electronically connected to engine 10 via connection 36 to generate a signal directly proportional to engine rpm.

Figure 1:
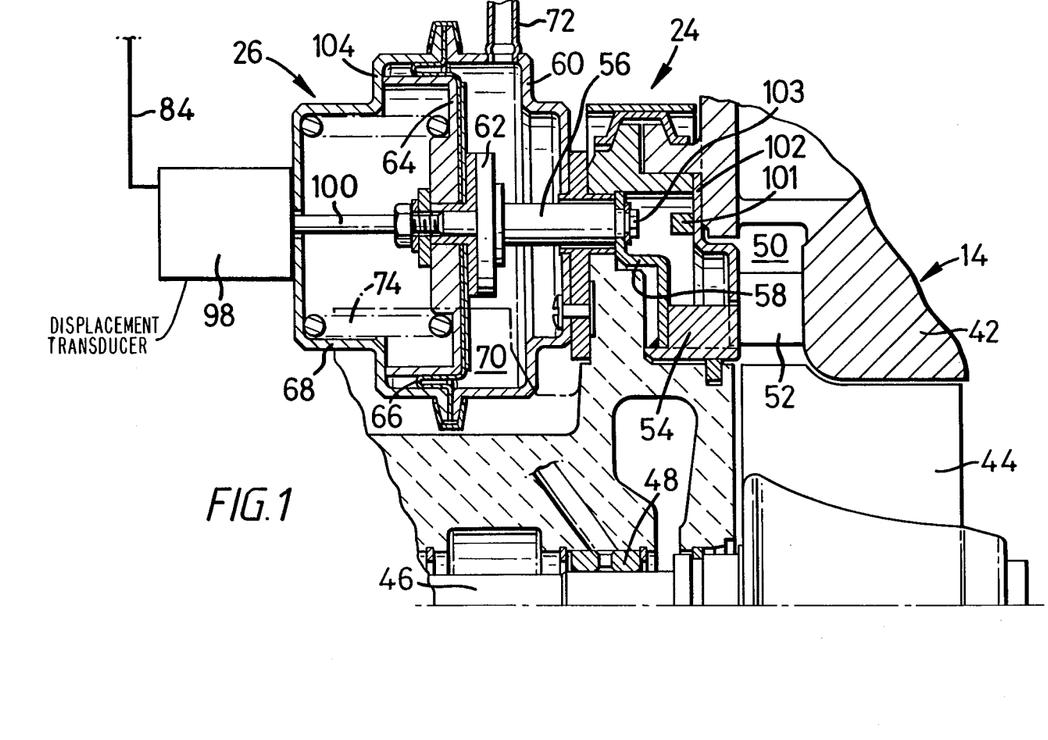
FIG. 1 is a sectional view of part of the turbine portion of a turbocharger, with which the present invention may be used.

Referring to FIG. 1, the turbine portion 14 comprises a housing 42 which contains a rotatable centripetal turbine wheel 44 mounted on a shaft 46 which is journalled in bearing assembly 48 and connected to the compressor 16 (not shown in FIG. 1). Exhaust gases are admitted to the wheel 44 past an annular nozzle passage 50 having a plurality of vanes 52 which direct gases flowing inward in the appropriate tangential direction. The flow area of the nozzle passage 50 is varied by an annular control ring 54 which is slotted to embrace vanes 52 and to variably obstruct nozzle passage 50. The control ring 54 is translatable into and out of nozzle passage 50 by an output shaft 56 of the actuator assembly 26, by means of a flange 58. The actuator assembly 26 comprises a first formed housing 60 fixed to the turbine and through which shaft 56 extends to flanges 62, 64 which sandwich a diaphragm 66. Diaphragm 66 has its outer perimeter sandwiched between housing 60 and a second housing 68, suitably fixed to one another. Diaphragm 66 and housing 60 define a variable volume chamber 70 which is pressurized through line 72 to a controlled level. A spring 74 in housing 68 acts on diaphragm 66 in opposition to the force generated on it by the pressure in chamber 70. The spring 74, as illustrated in FIG. 1, may have a force versus displacement characteristic such that the pressure in chamber 70 is directly proportional to the displacement of shaft 56, and therefore the area of nozzle passage 50.

The pressure in chamber 70 is controlled by a solenoid valve 76 (FIG. 2) connected to a pressurized fluid (such as air) tank 78 by a line 80. Solenoid valve 76 may be of the type that is a pressure regulating valve in response to electrical signals from controller 28 via line 82 or alternatively an on/off valve.

The valve 76 is controlled to admit pressurized air from tank 78 to maintain the appropriate pressure in chamber 70. In order to permit controlled reduction of pressure in chamber 70, it is continuously bled, for example, by providing a clearance between shaft 56 and housing 60.

Controller 28 sends to solenoid valve 76 electrical pulses of appropriate duration in response to a predetermined schedule and the independent control inputs provided by rpm signal generator 34. In order to provide a feedback function for this system, the control system incorporates on housing 68 a displacement transducer 98 which has a rod 100 fixed to the end of shaft 56. Transducer 98 generates a signal and sends it to the controller 28 through line 84 to appropriately correct the control signal from controller 28. An end stop 101 is provided mounted on an annulus 102, which is attached to the turbine housing 42. The end stop 101 defines a limiting position of the shaft 56 and therefore of the control ring 54 and rod 100, when the bolt 103 abuts the stop. This corresponds to a minimum effective turbine area and a minimum or zero condition of the transducer 98. The inlet nozzle assembly is shown in FIG. 1 in a condition of maximum effective turbine area with the flange 64 abutting a shoulder 104 of the second housing 68. This therefore defines the maximum limiting position of the shaft 56, control ring 54 and rod 100 and a maximum condition of the transducer 98.

As described above, the controller 28 opens and closes the solenoid valve 76, thereby varying the pressure in chamber 70 and therefore the position of the rod 100, according to the rpm of the engine 10 monitored by the rpm signal generator 34. It will be appreciated that because the degree of compression of the spring depends on the position of the flange 64 and rod 100, the position of the flange 64 and rod 100 will depend on the pressure in the chamber 70 balancing the effect of the spring. The position transducer 98, in the form a variable inductor, measures the position of the rod 100.

The engine speed signal is fed along line 32 to the controller 28 where it is fed to a processor unit 110 which converts the signal into a demand signal representing the demanded effective area of the turbine or the demanded position of the rod 100 and ring 54. The demand signal is fed to a timer 111 and to a comparator unit 114. The measurement signals from the transducer 98 are fed along a line 84 to an interface unit 112 which converts the signals into measurement readings and feeds them continuously to a stack memory 113 at a frequency such as 160 Hz. This stack memory is of a conventional type having a plurality of value positions, typically four, for readings from the displacement transducer 98. When a value is fed into the top of the memory from unit 112, this reading "knocks out" the bottom reading in the stack. The memory regularly takes the average of the four values it holds and feeds this average value as a signal to the comparator unit 114. The comparator unit compares this measured and averaged position signal with the demanded position signal and computes from this difference a signal which it supplies to a valve drive module 115. The comparator unit 114 includes a 3-term controller, having integral and differential as well as proportional functions to provide any required lag or lead in the output signal. The output signal from the timer 111 is also supplied to the valve drive module 115 which in turn generates a valve drive signal to control the valve 76.

FIGS. 3(a) through 3(e) show four of the signals and the pressure in chamber 70 plotted against time t as follows:

3(a) engine speed signal
3(b) Demanded position signal
3(c) measured and averaged position signal
3(d) valve drive signal
3(e) pressure in chamber 70.

It will be appreciated that there will be certain time delays between successive variables due to response times, process times, dynamics of the solenoid valve, time taken by air to fill pipes and actuators, inertia, friction effects and so forth.

The recalibration sequence is as follows. When the engine speed falls to the amount $V_1$ for which minimum area of the turbine is demanded as at time $t_1$, the demanded position signal is zero. The timer 111 monitors this signal and if the demanded position signal remains at zero for a preset time such as of two seconds until time $t_2$, the timer sends a trigger signal to the valve drive module 115 to shut-off the pressurized air supply to the chamber 70, to hold the rod 56 against the end stop 101. The zero demand signal corresponds of course to minimum effective turbine area, but due to the delays referred to above the effective area does not immediately fall into the minimum. As shown in FIG. 3(c), the effective area of the turbine falls during the preset time to an amount very slightly above but effectively equal to the minimum. After a further 0.5 of a second at time $t_3$, the valve drive signal starts to rise to allow pressurized air to bleed into the chamber 70 until the actuator rod 100 just starts to move off the stop, as shown in FIG. 3(c) at $t_4$.

This is to provide cooling air for the diaphragm 66, the air leaking out through the clearance between shaft 56 and housing 60, and also that the rod 100 can move promptly away from the end stop 101 when an increased effective turbine area is demanded. Optionally, a "fault" may be indicated by the controller if the valve drive signal reaches its maximum before the rod 100 moves.

At time $t_3$, the controller 28 causes the stack memory 113 to feed the last average which it has calculated of the measured position reading back to the interface unit 112 so that this average value then becomes the new zero reading of the displacement transducer 98. The zero value of the transducer is thereby recalibrated.

If the demanded position signal remains at zero for a further preset time of two minutes, measured in this particular instance from $t_2$, the timer again sends a signal to valve drive module 115 to cause the solenoid valve 76 to cut again the pressurized air supply to the chamber 70. The rod is therefore again held against the end stop 101 while another "calibration reading" is taken as before from the stack memory 113 and fed to the interface unit 112 to become the new zero measurement for the transducer 98.

If at any time during this calibration sequence the engine speed rises and demands an effective turbine area above the minimum, the calibration is aborted and the nozzle assembly 24 continues in its normal operating condition.

Additionally or even alternatively to the zero calibration, a calibration may be provided of the maximum condition of the transducer 98 in a similar manner as follows.

Figure 3A:
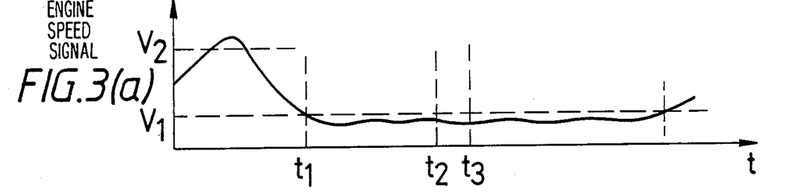
FIGS. 3(a) through 3(e) show various variables in the control system plotted against time.
Figure 3B:
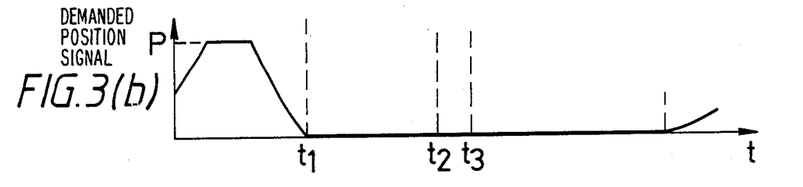
Figure 3C:
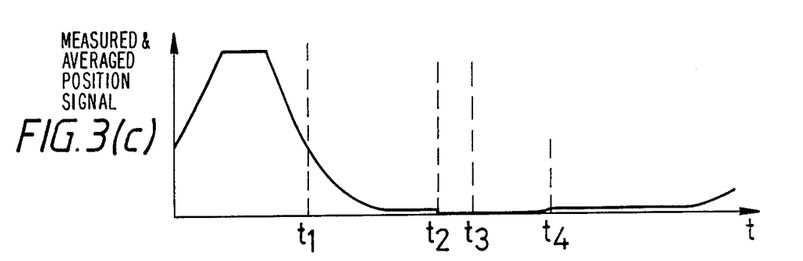
Figure 3D:
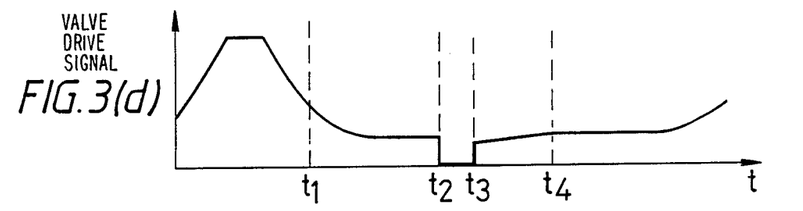
Figure 3E:
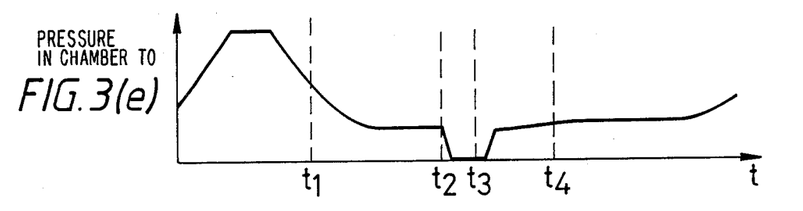

If the timer 111 detects that the demanded position signal has risen to a maximum value corresponding to the maximum effective turbine area for engine speeds greater than or equal to $V_2$ in FIG. 3(a), and that this signal is maintained for a preset time of two seconds, the timer sends trigger signal to the valve drive module 115 to operate the solenoid valve 76 to raise the pressure in the chamber 70 to a maximum pressure. This holds the flange 64 against the housing shoulder 104. The memory then feeds the measured and averaged position signal back to the receiver unit 112 to become the recalibrated maximum transducer value.

By calibrating the maximum and minimum transducer values in this way, an even more accurate overall calibration of the transducer is achieved. The recalibration of the zero value will occur whenever the engine speed drops to a low value, such as an idling speed, for sufficient time and the maximum value is recalibrated whenever the engine speed attains a certain high value and maintains at least this value for sufficient time as described.

The controller may monitor whether the rod 100 is moving by storing an average position value taken from the memory 113, recording a further average value from the memory after a certain time, and comparing the two values. The controller may continuously monitor whether the rod is moving in this way.

If the controller detects that the rod is still moving at time $t_3$, the sequence may be interrupted (before an average position reading is taken from the memory and fed to the interface unit 112) until either the rod has stopped or a preset time has elapsed or a preset number of average readings has been taken. This is all equally applicable to calibration of the maximum value.

Optionally, the controller 28 may incorporate a "failure" sequence as follows. If the controller detects that the rod 100 has not returned to the end stop 103 by time $t_3$, that is the signal in FIG. 3(c) is not zero within predetermined tolerance limits, at that time, it issues a "fail" signal and e.g. a warning light is caused to flash. The controller then maintains the solenoid valve shut and detects whether the signal is zero (within the limits, or is still seen to be moving toward zero) after a further predetermined time. If the signal has still not reached zero (within the limits, or is still seen to be moving toward zero) the same happens again, and is set to happen a plurality of times, perhaps 10 times, before the controller determines that the system has failed. If the signal is still outside the limits, the controller may issue a "final fail" signal and may either set a nominal value for the valve drive signal, such as that corresponding to half the maximum effective area of the turbine, or may resort to some other open-loop control of effective turbine area. If the signal is within the limits but still decreasing, the controller may issue a "possible fail" signal but accepts the latest average position reading as valid and uses it as a new zero calibration.

Similar "failure" provisions may be arranged for the maximum value calibration.

In the illustrated embodiment, the demanded position signal is used as the "trigger" (at time $t_1$) for the preset time between $t_1$ and $t_2$ necessary to elapse before recalibration is initiated. However, alternatively, the position of the displacement transducer could be directly monitored, or other operating variables in the system could be monitored, for this purpose. For instance, the air pressure in chamber 70 could be monitored, the preset time commencing when this pressure drops (or rises) to the amount corresponding to minimum (or maximum) effective turbine area.

Figure 4A:
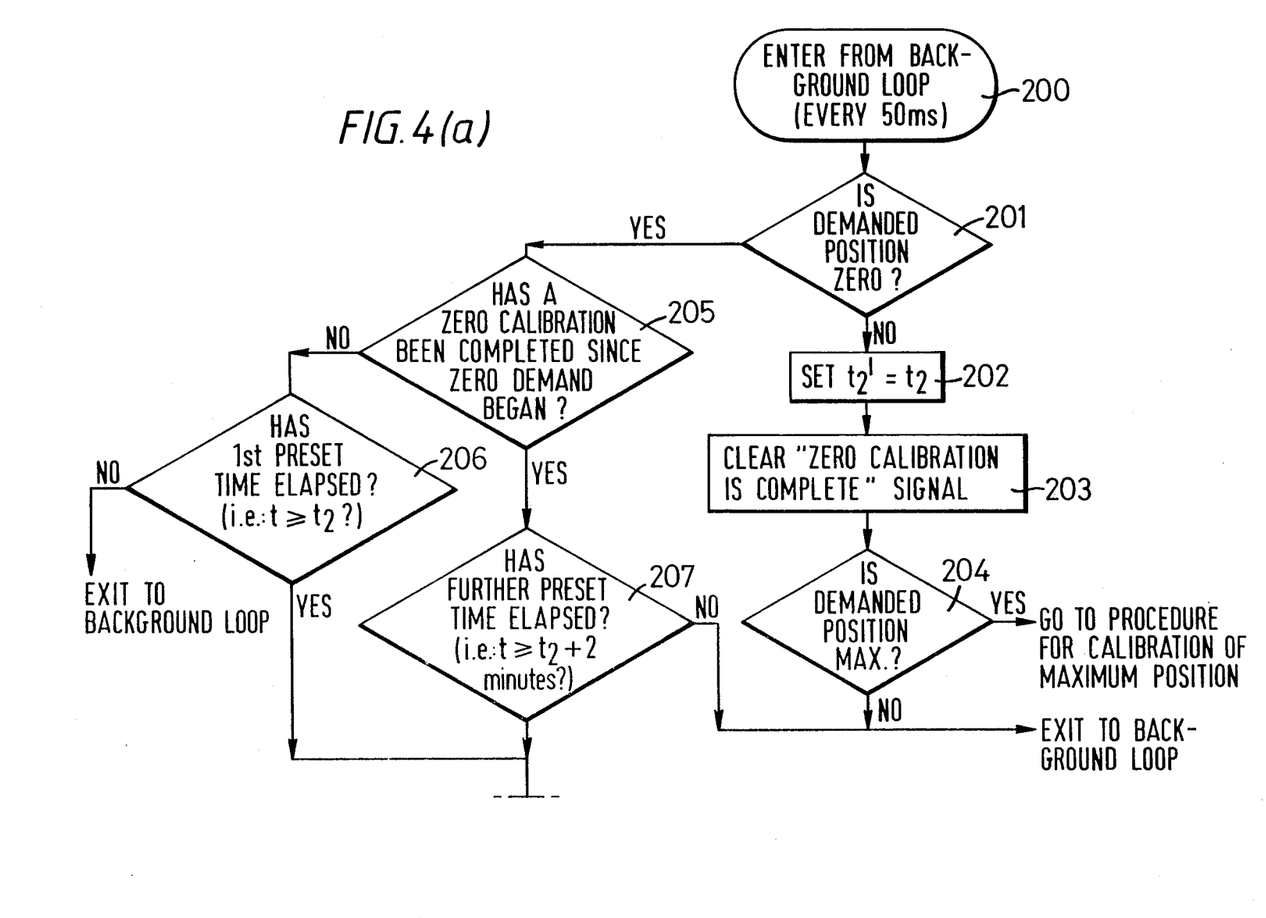
FIGS. 4(a) through 4(d) are flow diagrams showing an example of how the controller may be operated in connection with the calibration.
Figure 4B:
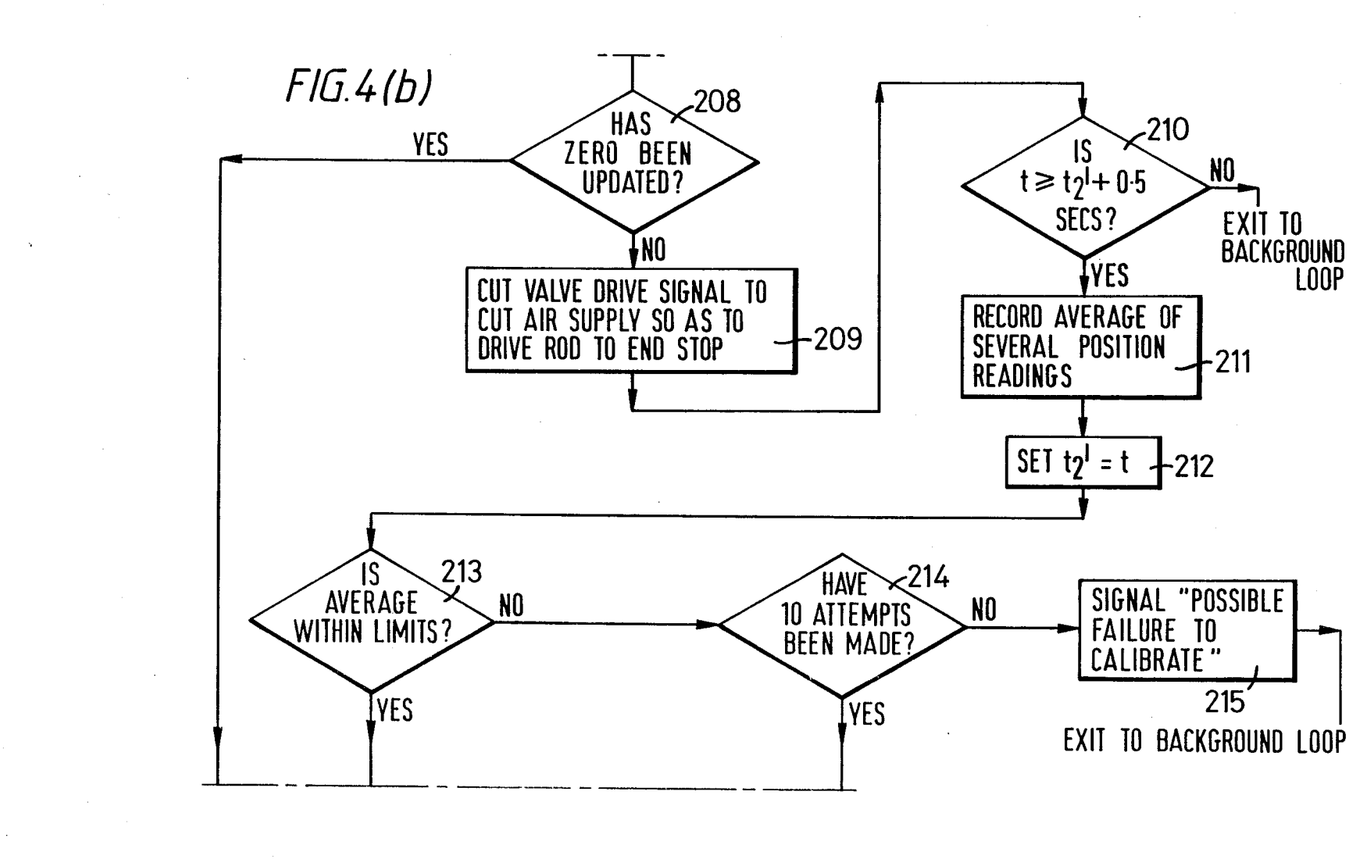
Figure 4C:
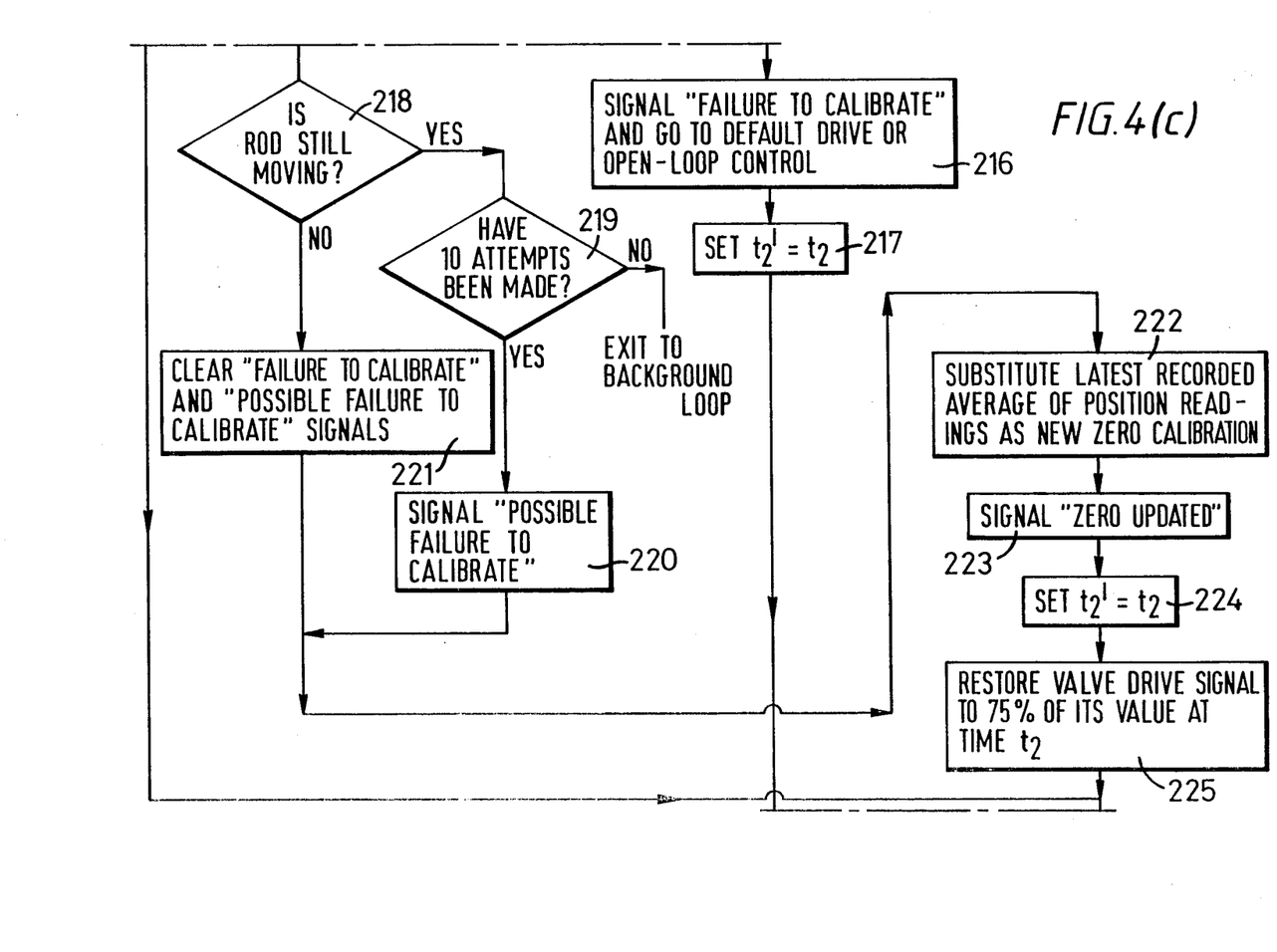
Figure 4D:
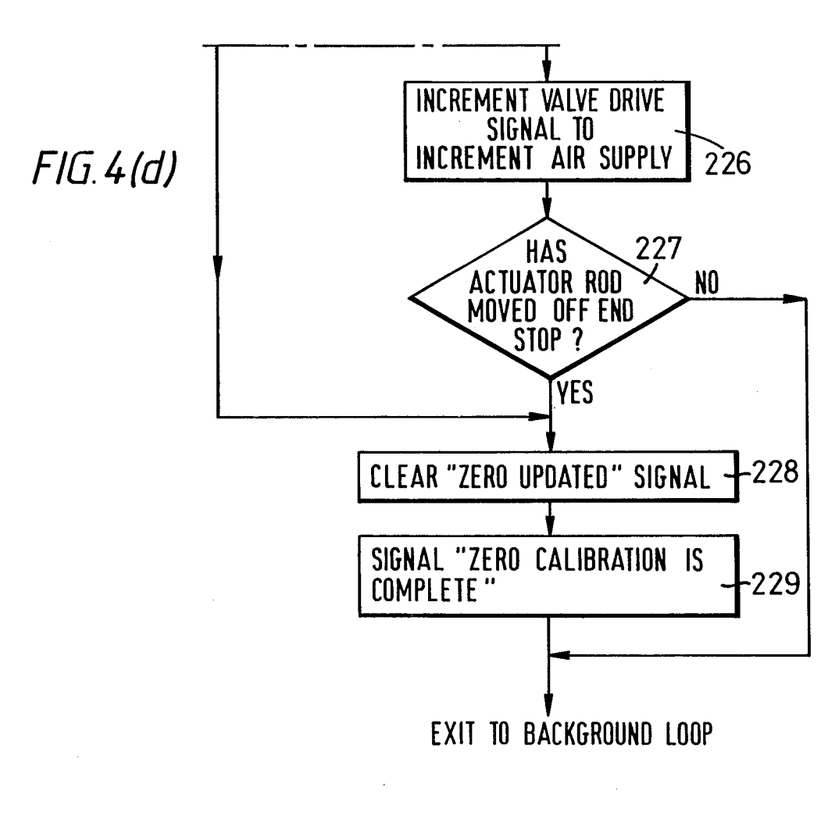

The controller 28 may be a microprocessor appropriately programmed to accomplish the foregoing. FIGS. 4(a) through 4(c) are flow diagrams of a possible sequence of steps in operating the controller in such a case for the zero calibration. The procedure for calibrating the maximum position may of course be arranged on similar lines.

In the example of FIG. 4(a), the controller continuously operates a "background loop" by which it controls the valve drive signal in accordance with the engine speed signal. Every 50 milliseconds the "calibration loop" shown in FIG. 4(a) is entered and the sequence of steps shown will be self-explanatory. However, the following comments referring back to FIGS. 2 and 3 may assist a rapid comprehension of the diagram.

In the approach to time $t_1$, the demanded position is greater than zero and steps 201–204 are followed. At step 204, the maximum value calibration procedure loop is entered if the demanded position is maximum, otherwise the sequence returns to the background loop.

At time $t_1$, the demanded position reaches zero and the route to steps 205 and 206 is taken. Step 206 is the test for whether the preset time of 2 seconds has elapsed from commencement of the zero demanded position at $t_1$, i.e. has $t_2$ been reached. Until it has, the sequence returns to the background loop; when $t_2$ is reached, the sequence continues to steps 208, 209 and 210. The latter is the test for whether $t_2'$ has been reached; if it has not, the sequence returns to the background loop, when $t_2'$ is reached, the sequence continues to steps 211, 212 and 213. The latter is the test for whether the average position value taken from the memory 113 is within the predetermined tolerance limits around zero. If the answer is no, the sequence branches off for the "failure" provisions explained above; the sequence returns to the background loop through steps 214 and 215 ten times over (i.e., giving the rod 110 ten chances to return to the end stop 101). At this point, it should be explained that $t_2'$ is an internal variable used to know when a new average must be recorded because the previous one is outside the tolerance limits; $t_2'$ is "updated" at 212 each time an attempt is made to record an average within the limits. Thus, the controller effectively "goes back" to $t_2$ (a maximum of 10 times) if at $t_3$ the average is not within the limits, there being a delay of 0.5 of a second (step 210) before each successive attempt.

On the tenth attempt, the sequence turns from 214 to 216 and 217, "failure to calibrate" being signalled.

If, referring back to 213, the average is within the limits, 218 tests whether the rod is still moving. If yes, the sequence turns to 219 and up to 10 attempts are made to record an average with the rod stationary. On the tenth attempt a "possible failure to calibrate" (220) is signalled and the sequence nevertheless continues to 222, which is the actual calibration itself, and on to 223–225. If the rod is not moving, any failure signals are cancelled (221) and 222 is proceeded with directly. $t_3$ has now been reached. Now the valve drive signal is raised incrementally, steps 200, 201, 205, 206, 208, 226, 227 and EXIT being taken until the rod just moves off the end stop (see YES route from 227), at time $t_4$, when the "zero updated" signal is cleared and "zero calibration is complete" is signalled. Lastly, 207 is the test for whether a further 2 minutes has elapsed; if it has, the sequence again proceeds to 208 to attempt another zero calibration.

The above controller not only calibrates to maintain continuing accuracy of movement of the member, but does so with a minimum disruption to the normal function of the controller.

While a preferred embodiment of the present invention has been described, it should be apparent to those skilled in the art that it may be practiced in other forms without departing from the spirit and scope thereof.

Having thus described the invention, what is novel and desired to be secured by Letters Patent of the United States is:

We claim:

1. A method of calibrating a measuring device which measures the position of a movable member actuatable in response to a control signal, the member having a first limiting position, comprising the steps of monitoring a signal reflecting a condition of when the member reaches the first limiting position, monitoring the time during which the signal reflecting the first limiting position condition continues, comparing the monitored time with a first predetermined time, and, if the first limiting position condition continues for at least as long as the first predetermined time, maintaining said control signal at a level which insures the member is at said first limiting position and, subsequently taking a measurement of the signal reflecting the actual position of the movable member in such limiting position condition, and using this measurement to calibrate the device.

2. A method as in claim 1 wherein:

said control signal is a pressure signal and the first limiting position is achieved when the pressure signal is at or adjacent zero, and the control signal is dropped to zero for the measurement of the actual position of the movable member.

3. A method as in claim 1 wherein the member has a second limiting position, the member being movable between the first and second limiting positions, comprising the steps of monitoring a signal reflecting a second condition of when the member reaches the second limiting position, monitoring the time during which the signal reflecting the second limiting position condition continues and comparing this time with a second predetermined time, and, if the second limiting position condition continues for as long as the second predetermined time maintaining said control signal at a level which insures the member is at said second limiting position and, taking a measurement of the actual position of the movable member, and using this measurement to calibrate the device.

4. A method as in claim 3 wherein:

said control signal is a pressure signal and the second limiting position is achieved when the pressure signal is at or adjacent a maximum pressure level, and the control signal is increased to said maximum level for the measurement of the movable member.

5. A method as in claim 1 further comprising the steps of taking at least one further measurement of the actual position of the movable member if the first limiting position condition continues for as long as the first predetermined time, computing the average value of the measurements taken at the first position, and using this average value to calibrate the device.

6. A method as in claim 2 further comprising the steps of taking at least one further measurement of the actual position of the movable member if the second limiting position condition continues for as long as the second predetermined time, computing the average value of the measurements taken at the second position, and using this average value to calibrate the device.

7. A method as in claim 2 further comprising the steps of comparing the time during which the first and/or second limiting position conditions continue with a third predetermined time and, if the first and/or second limiting position conditions continue for as long as the third predetermined time, taking another measurement of the actual position of the movable member, and using this measurement to calibrate the device.

8. A method as in claim 1 further comprising the steps of detecting whether the movable member has reached the first limiting position within a certain time after commencement of the respective limiting position condition, and, if the movable member has not done so, issuing a fail signal.

9. A method as in claim 8 comprising at least one further step of detecting whether the movable member has reached the first limiting position after a further or additional further predetermined time after the first detection, and, if the movable member has not done so, issuing a further fail signal.

10. A controller for a movable member positioned in response to a control signal and having a limiting position, said controller comprising, means for generating a demanded control signal, means for generating a position signal reflecting the actual position of said member, comparator means for receiving said demanded control signal and said position signal to generate an error signal, means receiving the signal from said comparator means for generating a control signal for positioning said member, timing means for monitoring the demanded control signal reflecting a condition when the member reaches the limiting position, said timing means monitoring the time during which the limiting position condition continues, comparing this time with a predetermined time and generating a trigger signal if the limiting position condition continues for at least as long as the predetermined time, said trigger signal actuating said control signal generating means to maintain said member in the limiting position, and means receiving said position signal for establishing the position signal generated during the time a member is maintained in said limiting position by said trigger signal as the calibrated limiting position signal.

* * * * *